US 6,577,028 B2

(12) United States Patent
Laskaris et al.

(10) Patent No.: US 6,577,028 B2
(45) Date of Patent: Jun. 10, 2003

(54) HIGH TEMPERATURE SUPERCONDUCTING ROTOR POWER LEADS

(75) Inventors: Evangelos Trifon Laskaris, Schenectady, NY (US); James Pellegrino Alexander, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/855,034

(22) Filed: May 15, 2001

(65) Prior Publication Data

US 2002/0171300 A1 Nov. 21, 2002

(51) Int. Cl.⁷ .................................................. H02K 1/32
(52) U.S. Cl. ........................................................ 310/64
(58) Field of Search .............................. 310/64, 52, 54, 310/57, 58, 71

(56) References Cited

U.S. PATENT DOCUMENTS

| | | | | |
|---|---|---|---|---|
| 4,001,617 A | * | 1/1977 | Boyer | 310/52 |
| 4,164,671 A | * | 8/1979 | Gamble | 310/52 |
| 4,389,585 A | * | 6/1983 | Yamaguchi et al. | 310/261 |
| 4,876,413 A | * | 10/1989 | Vermilyea | 174/15.4 |
| 5,532,663 A | | 7/1996 | Herd et al. | 335/216 |
| 5,548,168 A | | 8/1996 | Laskaris et al. | 310/52 |
| 5,672,921 A | | 9/1997 | Herd et al. | 310/52 |
| 5,774,032 A | | 6/1998 | Herd et al. | 335/216 |
| 5,777,420 A | | 7/1998 | Gamble et al. | 310/261 |
| 5,798,678 A | | 8/1998 | Manlief et al. | 335/216 |
| 5,884,485 A | | 3/1999 | Yamaguchi et al. | |
| 5,953,224 A | | 9/1999 | Gold et al. | 363/98 |
| 6,066,906 A | | 5/2000 | Kalsi | 310/179 |
| 6,140,719 A | | 10/2000 | Kalsi | 310/52 |
| 6,169,353 B1 | | 1/2001 | Driscoll et al. | 310/261 |
| 6,173,577 B1 | | 1/2001 | Gold | 62/51.1 |

OTHER PUBLICATIONS

Fast, Reactive Power Support, *HTS Generators*, American Superconductor™ (Feb. 27, 2001) pp. 1–4.
Patent Abstracts of Japan, vol. 1996, No. 4, Apr. 30, 1996 and JP 7–335422 (Hitachi Ltd.), Dec. 22, 1995.
Patent Abstract of Japan, vol. 1996, No. 3, Mar. 29, 1996 for JP 7–297455 (Sumitomo Heavy Ind. Ltd.).
Patent Abstract of Japan, vol. 1995, No. 6, Jul. 31, 1995 for JP 7–074018 (Fuji Electric Co. Ltd.).
Patent Abstract of Japan, vol. 5, No. 149 (E–075), Sep. 19, 1981 for JP 56–081077 (Hitachi Ltd.).

* cited by examiner

*Primary Examiner*—Nestor Ramirez
*Assistant Examiner*—Nguyen Hanh
(74) *Attorney, Agent, or Firm*—Nixon & Vanderhye P.C.

(57) ABSTRACT

The resistive power leads of a high temperature superconducting (HTS) rotor field coil are located in vacuum near the rotor axis and are cooled by thermal conduction to the return flow path by bonding the leads to the tubing bulkhead through ceramic insulators. The lead length, cross-section and electrical resistivity are optimized for minimum heat conduction and ohmic resistance heat transfer to the cold gas. Thermal expansion or contraction of the leads is accommodated by flexible sections at the warm and cold end of the leads.

17 Claims, 5 Drawing Sheets

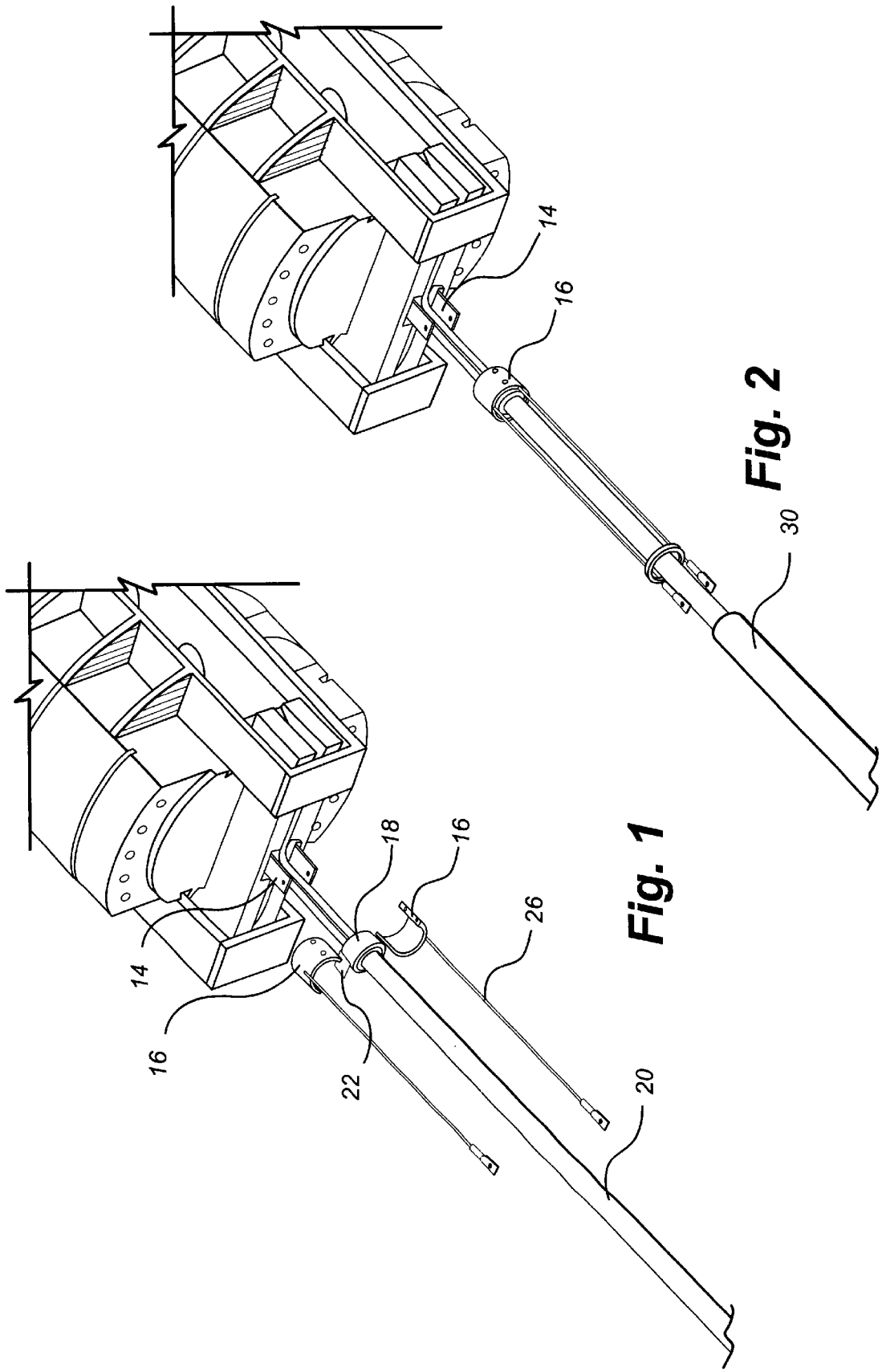

HIGH TEMPERATURE SUPERCONDUCTING ROTOR POWER LEADS

RELATED APPLICATIONS

This application is related to the following commonly-owned and commonly-filed applications (the specifications and drawings of each are incorporated herein):

U.S. patent application Ser. No. 09/854,932 entitled "Superconducting Synchronous Machine Having Rotor And A Plurality Of Super-Conducting Field Coil Windings", filed May 15, 2001 (atty. dkt. 839-1004);

Intentionally left blank—paragraph previously deleted

U.S. patent application Ser. No. 09/854,933 entitled "High Temperature Super-Conducting Rotor Coil Support With Split Coil Housing And Assembly Method", filed May 15, 2001 (atty. dkt. 839-1006);

U.S. patent application Ser. No. 09/854,931 entitled "Synchronous Machine Having Cryogenic Gas Transfer Coupling To Rotor With Super-Conducting Coils", filed May 15, 2001 (atty. dkt. 839-1007);

U.S. patent application Ser. No. 09/855,026 entitled "High Temperature Super-Conducting Synchronous Rotor Coil Support With Tension Rods And Method For Assembly Of Coil Support", filed May 15, 2001 (atty. dkt. 839-1008);

U.S. patent application Ser. No. 09/854,946 entitled "High Temperature Super-Conducting Rotor Coil Support With Tension Rods And Bolts And Assembly Method", filed May 15, 2001 (atty. dkt. 839-1009);

U.S. patent application Ser. No. 09/854,939 entitled "High Temperature Super-Conducting Coils Supported By An Iron Core Rotor", filed May 15, 2001 (atty. dkt. 839-1010);

U.S. patent application Ser. No. 09/854,938 entitled "High Temperature Super-Conducting Synchronous Rotor Having An Electromagnetic Shield And Method For Assembly", filed May 15, 2001 (atty. dkt. 839-1011);

U.S. patent application Ser. No. 09/854,940 entitled "High Temperature Super-Conducting Rotor Coil Support And Coil Support Method", filed May 15, 2001 (atty. dkt. 839-1012);

U.S. patent application Ser. No. 09/878,327 entitled "Account Management System", filed May 15, 2001 (atty. dkt. 839-1013);

U.S. patent application Ser. No. 09/854,937 entitled "High Temperature Super-Conducting Rotor Having A Vacuum Vessel And Electromagnetic Shield And Method For Assembly", filed May 15, 2001 (atty. dkt. 839-1016);

U.S. patent application Ser. No. 09/854,944 entitled "A High Power Density Super-Conducting Electric Machine", filed May 15, 2001 (atty. dkt. 839-1019);

U.S. patent application Ser. No. 09/854,943 entitled "Cryogenic Cooling System For Rotor Having A High Temperature Super-Conducting Field Winding", filed May 15, 2001 (atty. dkt. 839-1062); and U.S. patent application Ser. No. 09/854,464 entitled "High Temperature Super-Conducting Racetrack Coil", filed May 15, 2001 (atty. dkt. 839-1063).

BACKGROUND OF THE INVENTION

The present invention relates generally to synchronous rotating machines. More particularly, the present invention relates to power leads for high temperature superconducting field windings in the rotor of a synchronous machine.

Synchronous electrical machines having field coil windings include, but are not limited to, rotary generator, rotary motors, and linear motors. These machines generally comprise a stator and rotor that are electromagnetically coupled. The rotor may include a multi-pole rotor core and coil windings mounted on the rotor core. The rotor cores may include a magnetically-permeable solid material, such as an iron-core rotor.

Conventional copper windings are commonly used in the rotors of synchronous electrical machines. Electrical resistance of copper windings, however, is sufficient (although low by conventional measures) to contribute to substantial heating of the rotor and to diminish the power efficiency of the machine. Recently, superconducting coil windings have been developed for rotors, which have effectively no resistance and are highly advantageous rotor coil windings.

Typical superconducting rotor windings are made from saddle shaped coils that are assembled around cylindrical shells for structural support. These saddle shaped coils are complex winding structures that are cooled in direct contact with cryogens. The power leads are also cooled by cryogens through parallel flow circuit paths that present a challenge to control flow rate and temperature stability in the high centrifugal acceleration fields.

BRIEF SUMMARY OF THE INVENTION

In an exemplary embodiment of the invention, a power lead is provided for a high temperature superconducting (HTS) rotor winding coil. The power lead includes a heat station block attachable to a return flow tubing bulkhead, a ceramic insulator securable between the heat station block and the return flow tubing bulkhead, and thermally optimized current leads coupled with the heat station block. Preferably, the heat station block includes two half-blocks that are sized to sandwich the return flow tubing bulkhead, wherein the power lead includes two thermally optimized current leads, one each coupled with each of the heat station half-blocks. The half-blocks may be secured to each other with electrically insulated bolts. The ceramic insulator may be formed of one of beryllia and sapphire and may be metal plated on both sides excluding edges thereof. The thermally optimized current leads are particularly configured with a cross-section, length and electrical resistance to carry rotor current with margin for transients while minimizing heat transfer as a result of ohmic resistance heating and thermal conduction heat transfer.

In another exemplary embodiment of the invention, a power lead for an HTS rotor winding coil includes heat station blocks electrically couplable with a rotor of an electrical machine. The heat station blocks are electrically insulated from a return flow tubing while being thermally coupled with the return flow tubing via a ceramic insulator interposed therebetween for thermal conductivity between the heat station blocks and the return flow tubing.

In yet another exemplary embodiment of the invention, an electric machine includes a stator and a rotor coupled with the stator for rotation relative to the stator about a rotor axis. The rotor includes lead terminals disposed in a vicinity of the rotor axis. A return flow tubing is provided for carrying a coolant for heat exchanger cooling, and an HTS rotor winding coil is coupled with the rotor lead terminals via the HTS power leads of the present invention. Lead sections of braided copper or the like are preferably coupled between the heat station block and the rotor lead terminals.

BRIEF DESCRIPTION OF THE DRAWINGS

FIG. 1 is an assembly drawing of the power lead for an HTS rotor field coil;

FIG. 2 shows the power lead of FIG. 1 and a thermal stand-off support tube;

DETAILED DESCRIPTION OF THE INVENTION

Figure 3:
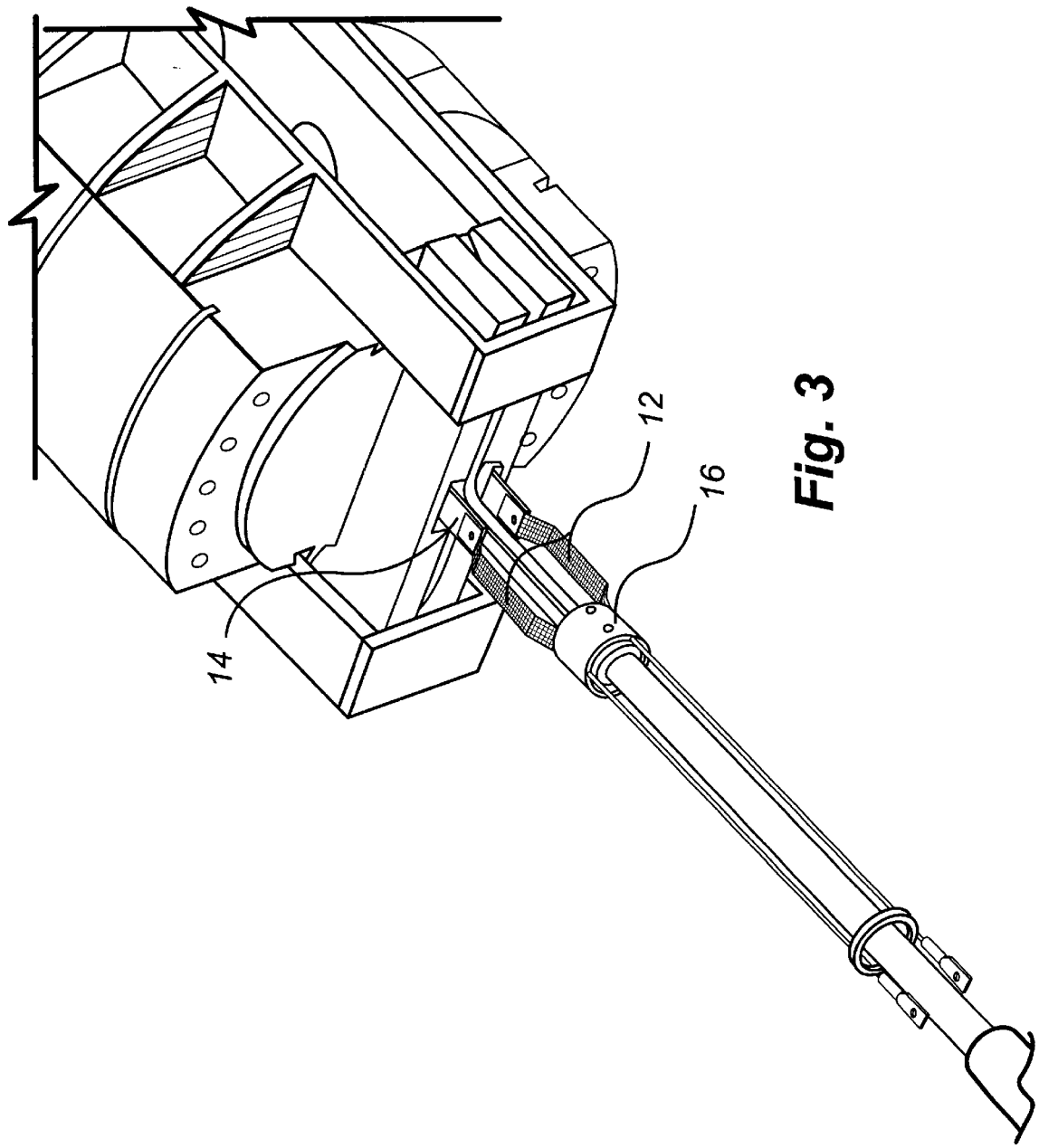
FIG. 3 shows the power lead coupled with the HTS rotor.
Figure 4:
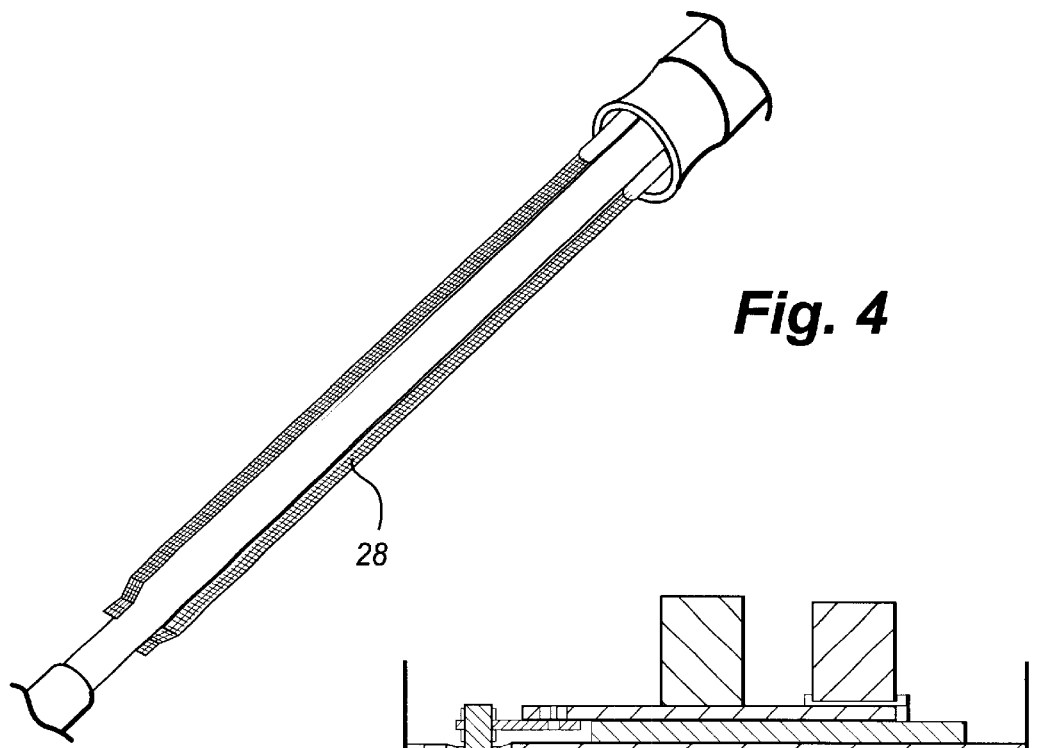
FIG. 4 shows the thermally optimized current leads coupled with braided copper lead sections that connect to the ceramic vacuum feed throughs.
Figure 5:
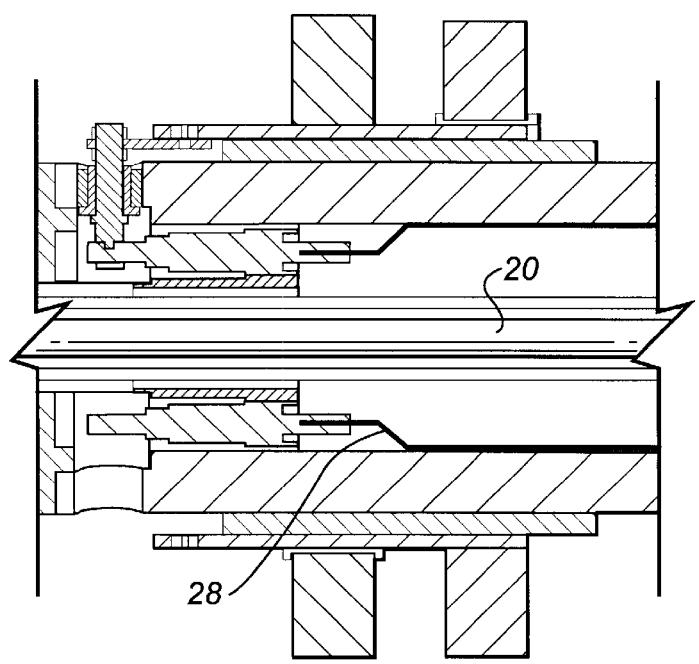
FIGS. 5–8 are mechanical drawings showing the HTS rotor power leads and rotor of the invention.
Figure 6:
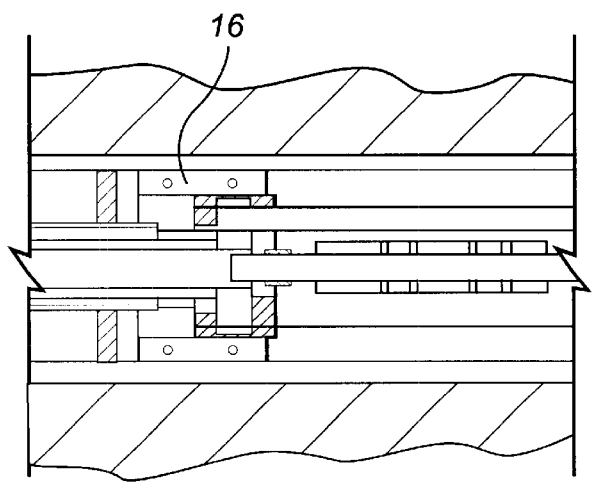
Figure 7:
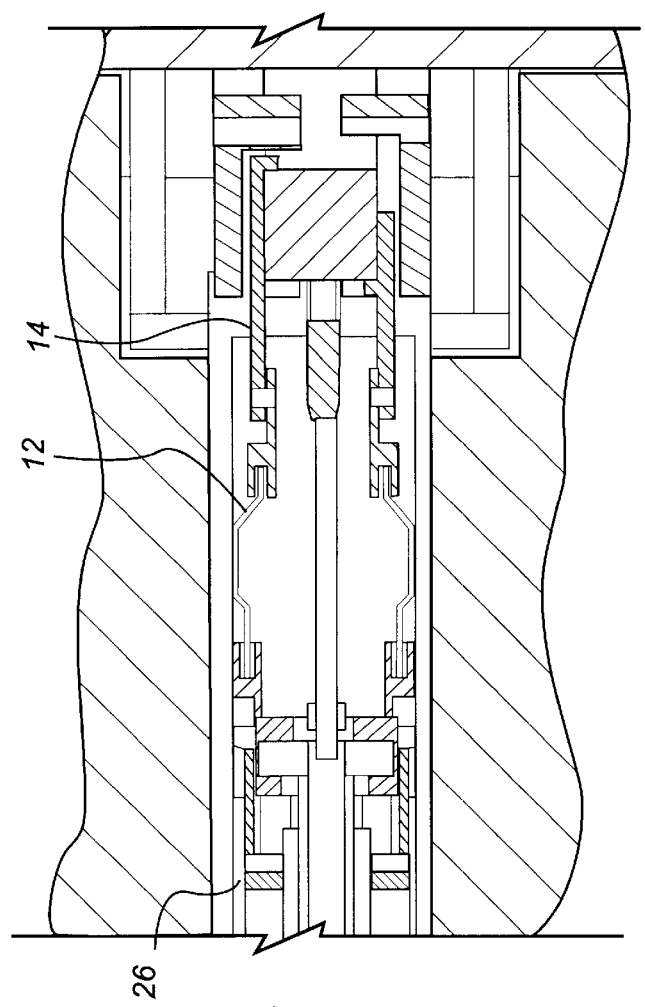
Figure 8:
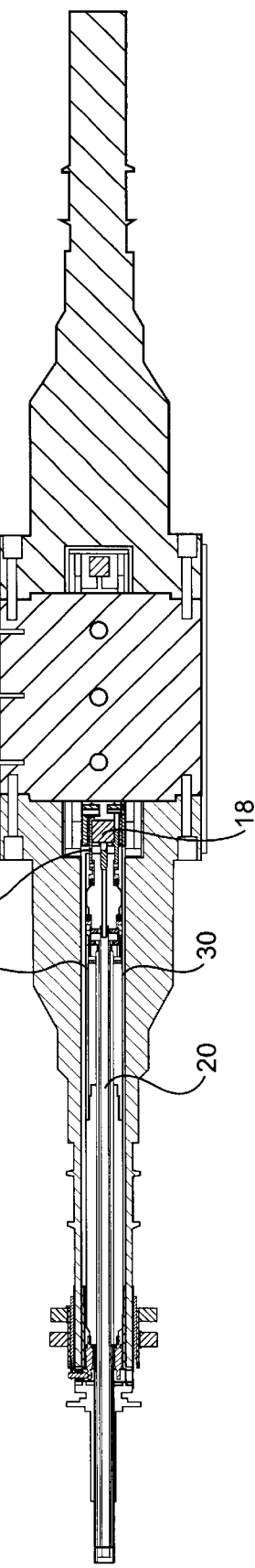
Figure 9:
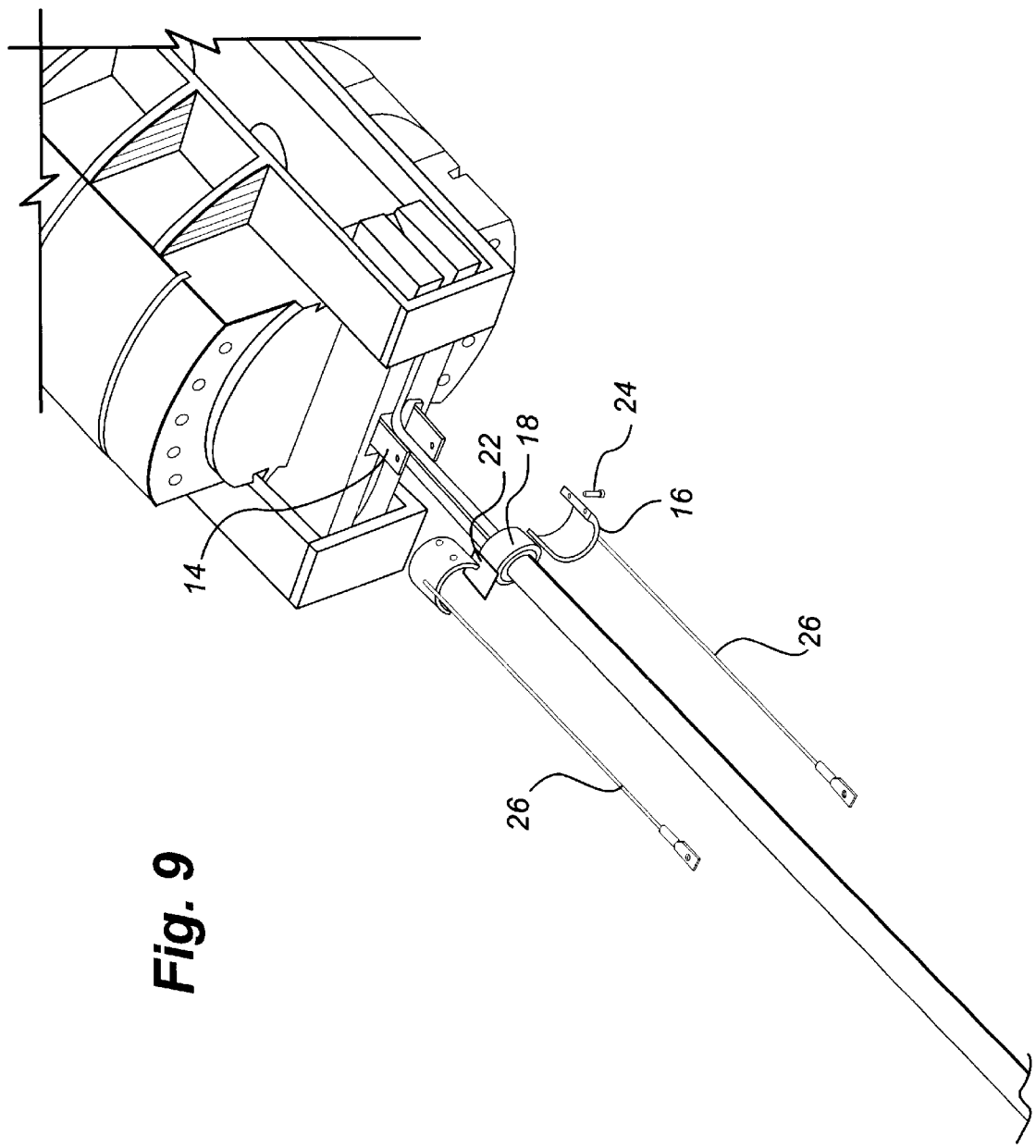
FIG. 9 is an enlarged assembly drawing of the power lead of the invention.

Referring to the FIGURES, the power leads for an HTS rotor winding coil are shown. The HTS coil start and finish leads (not shown), are preferably soldered to copper terminals 14 that are located near the rotor axis so that they are subjected to low centrifugal loads. Return flow tubing 20 carries cryogens from the HTS coil heat-exchanger cooling tube, adjacent the copper terminals 14, to the end of the rotor shaft (shown in FIG. 8) where a fluid transfer coupling delivers the cryogens to an external source of cryogenic cooling fluid. Short braided copper lead sections 12 connect the coil terminals 14 to copper heat station blocks 16. Preferably, the heat station blocks 16 are formed of two half-blocks that are sized to sandwich the bulkhead 18 of the return flow tubing 20. The heat station half-blocks 16 are bolted to each other with electrically insulated bolts 24 as shown in FIG. 9, which support the centrifugal loading.

Metal-plated ceramic insulators 22 are soldered on one side to the heat station blocks 16 and on the other side to the return flow tubing bulkhead 18 so that the power leads are conduction cooled to reject heat to the rotor return flow path. The heat station blocks 16 are electrically insulated from the return flow tubing 20 by the ceramic insulators 22 but reject heat efficiently with low temperature difference because the ceramic insulators 22 are designed for high thermal conductivity at cryogenic temperatures. The ceramic insulators 22 are typically made of thin plates of beryllia (beryllium oxide) or sapphire that are metal-plated on both sides excluding the edges thereof in order to provide adequate electrical insulation to the HTS coil. Typical insulator thicknesses vary from 0.040" to 0.125". Thicker insulators improve the electrical insulation or voltage breakdown capability of the HTS coil at the expense of degrading the cooling capacity of the heat station.

Thermally optimized current leads 26 are soldered on one end to the heat station blocks 16 and on the other end to braided copper lead sections 28 that connect to the ceramic vacuum feed throughs (vacuum tight ceramic insulated copper terminals). The current leads 26 are optimized to carry the highest current for the lowest thermal load to the heat station. The cross-section, length and electrical resistance of the thermally optimized lead sections 26 are designed to carry the rotor current with ample margin for transients and minimize the heat transfer to the cold end as a result of ohmic resistance heating and thermal conduction heat transfer. The thermally optimized sections of the power leads are supported by a thin wall thermal stand-off fiberglass tube 30 that is attached to the rotor bore at one end and supports the heat station blocks 16 and return tubing bulkhead 18 at the other end.

With the construction of the HTS rotor power leads of the invention, heat station blocks of the power lead are electrically coupleable with a rotor of an electrical machine and are electrically insulated from a return flow tubing while being thermally coupled with the return flow tubing via a ceramic insulator interposed therebetween. The ceramic insulator provides for thermal conductivity between the heat station blocks and the return flow tubing. The thermally optimized current leads accommodate transients while minimizing heat transfer.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A power lead for a high temperature superconducting (HTS) rotor winding coil, the power lead comprising:
   a heat station block attachable to a return flow tubing bulkhead;
   a ceramic insulator securable between the heat station block and the return flow tubing bulkhead; and
   thermally optimized current leads coupled with the heat station block, wherein the heat station block comprises two half-blocks that are sized to sandwich the return flow tubing bulkhead, and wherein the power lead comprises two thermally optimized current leads, one each coupled with each of the heat station half-blocks.

2. A power lead for an HTS rotor winding coil according to claim 1, wherein the half-blocks are secured to each other with electrically insulated bolts.

3. A power lead for an HTS rotor winding coil according to claim 1, wherein the ceramic insulator is formed of either beryllia or sapphire.

4. A power lead for an HTS rotor winding coil according to claim 3, wherein the ceramic insulator is metal plated on both sides excluding edges thereof.

5. A power lead for an HTS rotor winding coil according to claim 1, wherein the thermally optimized current leads are particularly configured with a cross-section, length and electrical resistance to carry rotor current with margin for transients while minimizing heat transfer as a result of ohmic resistance heating and thermal conduction heat transfer.

6. A power lead for a high temperature superconducting (HTS) rotor winding coil, the power lead comprising heat station blocks electrically coupleable with a rotor of an electrical machine, the heat station blocks being electrically insulated from a return flow tubing while being thermally coupled with the return flow tubing via a ceramic insulator interposed therebetween for thermal conductivity between the heat station blocks and the return flow tubing, wherein the heat station blocks each comprises two half-blocks that are sized to sandwich the return flow tubing bulkhead, and wherein the power lead comprises two thermally optimized current leads, one each coupled with each of the heat station half-blocks.

7. A power lead for an HTS rotor winding coil according to claim 6, further comprising thermally optimized current leads coupled with the heat station blocks.

8. A power lead for an HTS rotor winding coil according to claim 7, wherein the thermally optimized current leads are particularly configured with a cross-section, length and electrical resistance to carry rotor current with margin for transients while minimizing heat transfer as a result of ohmic resistance heating and thermal conduction heat transfer.

9. A power lead for an HTS rotor winding coil according to claim 6, wherein the ceramic insulator is formed of either beryllia or sapphire.

10. A power lead for an HTS rotor winding coil according to claim 9, wherein the ceramic insulator is metal plated on both sides excluding edges thereof.

11. An electric machine comprising:

a stator;

a rotor coupled with the stator for rotation relative to the stator about a rotor axis, the rotor including lead terminals disposed in a vicinity of the rotor axis;

a return flow tubing carrying a coolant for heat exchanger cooling; and a high temperature superconducting (HTS) rotor winding coil coupled with the rotor lead terminals via resistive power leads, the power leads comprising:
a heat station block attachable to a bulkhead of the return flow tubing,
a ceramic insulator securable between the heat station block and the return flow tubing bulkhead, and
thermally optimized current leads coupled with the heat station block, wherein the heat station block comprises two half-blocks that are sized to sandwich the return flow tubing bulkhead, and wherein the power leads comprise two thermally optimized current leads, one each coupled with each of the heat station half-blocks.

12. An electric machine according to claim 11, further comprising lead sections coupled between the heat station block and the rotor lead terminals.

13. An electric machine according to claim 12, wherein the lead sections comprise braided copper.

14. An electric machine according to claim 11, wherein the half-blocks are secured to each other with electrically insulated bolts.

15. An electric machine according to claim 11, wherein the ceramic insulator is formed of one of beryllia and sapphire.

16. An electric machine according to claim 15, wherein the ceramic insulator is metal plated on both sides excluding edges thereof.

17. An electric machine according to claim 11, wherein the thermally optimized current leads are particularly configured with a cross-section, length and electrical resistance to carry rotor current with margin for transients while minimizing heat transfer as a result of ohmic resistance heating and thermal conduction heat transfer.

* * * * *

UNITED STATES PATENT AND TRADEMARK OFFICE
CERTIFICATE OF CORRECTION

PATENT NO.    : 6,577,028 B2
DATED         : June 10, 2003
INVENTOR(S)   : Laskaris et al.

It is certified that error appears in the above-identified patent and that said Letters Patent is hereby corrected as shown below:

Column 2,
Line 4, delete "generator" and insert -- generators --.

Signed and Sealed this

Fifteenth Day of July, 2003

JAMES E. ROGAN
*Director of the United States Patent and Trademark Office*